United States Patent [19]

Nicholakopoulos et al.

[11] 4,451,593

[45] May 29, 1984

[54] PROCESS FOR FINISHING RESIN USING REDUCED ENERGY INPUT

[75] Inventors: Antonios Nicholakopoulos, Mercerville; Grace M. Gill, S. Somerville; Robert P. Nadin, Wharton, all of N.J.

[73] Assignee: Union Carbide Corporation, Danbury, Conn.

[21] Appl. No.: 401,717

[22] Filed: Jul. 26, 1982

Related U.S. Application Data

[63] Continuation-in-part of Ser. No. 249,651, Mar. 31, 1981, abandoned.

[51] Int. Cl.³ ................................................ C08J 3/12
[52] U.S. Cl. ................................... 523/322; 523/323; 528/502; 528/503
[58] Field of Search .............. 528/502, 503; 523/323, 523/322

[56] References Cited

U.S. PATENT DOCUMENTS

| | | | |
|---|---|---|---|
| 3,229,002 | 1/1966 | Feder | 264/15 |
| 3,472,491 | 10/1969 | Feder | 264/15 |
| 3,726,483 | 4/1973 | Kometani | 528/502 |
| 4,088,625 | 5/1978 | Gunbisch | 528/502 |
| 4,138,539 | 2/1979 | Landolt et al. | 526/93 |
| 4,220,511 | 9/1980 | Derbyshire | 528/502 |
| 4,252,968 | 2/1981 | Govoni | 528/483 |

FOREIGN PATENT DOCUMENTS

| | | | |
|---|---|---|---|
| 2302370 | 7/1974 | Fed. Rep. of Germany | 528/502 |
| 3524 | 2/1965 | Japan | 528/502 |
| 767639 | 2/1957 | United Kingdom | 528/502 |
| 1437849 | 4/1974 | United Kingdom . | |

*Primary Examiner*—C. A. Henderson
*Attorney, Agent, or Firm*—Gerald R. O'Brien, Jr.

[57] ABSTRACT

The specific energy input required to finish resin particles is considerably reduced when the resin particles are passed through a continuous finisher wherein the volume utilization of the finisher is between about 40 volume percent and about 95 volume percent, the tip velocity is between about 500 and 800 inches per second and the superficial mixing intensity exceeds about 0.7 kilowatts per liter.

8 Claims, No Drawings

PROCESS FOR FINISHING RESIN USING REDUCED ENERGY INPUT

This application is a continuation in part of U.S. Ser. No. 249,651 filed Mar. 31, 1981 now abandoned.

BACKGROUND OF THE INVENTION

Granular resins, as produced in polymerization reaction processes, are often put through a continuous finishing machine (sometimes called a continuous "intensive mixer") for various reasons in a commercial setting. For example, such a finishing machine might be used to improve the flowability of the resin particles, to provide a means to incorporate additives onto the resin particles, and the like.

Heretofore, continuous finishers have generally been commercially operated at a volume utilization of up to about 60 volume percent; tip velocities of up to about 700 inches per second and a superficial mixing intensity of up to about 0.5 kilowatts per liter. In one prior art system, the superficial mixing intensity was as high as 0.8 kilowatts per liter, but the volume utilization was less than 18%. It has long been felt that operation in this region is an efficient means to finish the resin particles in terms of machine reliability and final product properties. Volume utilization is defined as the fraction (%) of the mixer's internal volume occupied by the material, as determined by the average apparent density of the material (ASTM:D 1895-67) between inlet and outlet. Superficial Mixing Intensity is defined as the net power consumed by the resin (kilowatts) divided by the total internal volume of the mixer in liters.

SUMMARY OF THE INVENTION

It has now been found that the specific energy input required to finish resin particles can be significantly reduced vis-a-vis the former commercial practice when the resin particles are passed through a continuous finisher wherein the volume utilization of the finisher is between about 40 volume percent and about 95 volume percent, the tip velocity of the mixing arms is between about 500 and about 800 inches per second and the superficial mixing intensity is about 0.7 kilowatts per liter or greater.

DETAILED DESCRIPTION OF THE INVENTION

This invention relates to a process of finishing resins wherein the volume utilization of the finisher is between about 40 volume percent and about 95 volume percent; a tip velocity of about 500 to about 800 inches per second and a superficial mixing intensity of about 0.7 kw/l or greater. At these conditions, the energy input is substantially reduced as compared to the conditions generally commercially used heretofore. The energy reduction begins to occur when the superficial mixing intensity is about 0.7 kw/l and begins to disappear when the intensity is about 1.1 kw/l.

Typical finishers useful in the process of the present invention are described in U.S. Pat. Nos. 3,472,491 and 3,229,002, incorporated herein by reference.

As indicated above, the resin useful in the process of this invention is in particulate form (e.g., granules, powder, pulverized particles, and the like). The particle size of the resin is not overly critical and can vary over a wide range. The particulate resin useful in the process of this invention preferably has a particle diameter of from about 44 microns to about 25,000 microns, and more preferably the particle size is from 70 microns to 2,500 microns in diameter.

In the process of this invention, when polyethylene is the resin selected, the resin particles enter the finisher at between about ambient temperature and about 200° F. (preferably between about 75° F. and about 180° F.), and emerge from the finisher at an elevated temperature below the melt temperature of the resin. When using other resins such as, for example, polypropylene, polybutylene, and the like, the entering temperature range for particles going into the finisher could be adjusted up or down depending upon the melting point of the particular resin used, as would be known to those skilled in the art. The rise in temperature of the resin during the finishing operation is due to the heat generated by mechanical friction caused by contact between and among resin particles, additives (if present), mixing arms and scrapers, and finisher walls. A temperature rise may also be effected by externally applied heat if desired for any purpose, such as to soften the resin particles.

Since most resinous polymers do not have sharp melting points, but instead melt over a wide range of perhaps 5° F. to 15° F. (3° C.–8° C.), it is impractical to specify the maximum finishing temperature for all the polymers that can be employed in the present invention. The determination of this temperature should be made for each polymer employed.

The term "resin" as used herein, denotes thermoplastic or thermosetting polymers, preferably aliphatic or aromatic monoolefins in which the backbone chain of the polymer macromolecule is preferably substantially a non-crosslinked hydrocarbon chain with aliphatic or aromatic substituents. Exemplary olefin polymers include polymers of ethylene, propylene, butene-1 and higher 1-alkenes having from 5 to 10 carbon atoms as well as polymers of styrene, ar(t-butyl)styrene, alphamethystyrene, ar-chlorostyrene, ar-bromostyrene, armethylstyrene and other monovinylidene aromatic monomers. It is understood that the term "resin" includes homopolymers, copolymers and interpolymers of the foregoing aliphatic and aromatic olefins as well as mixtures and blends of such homopolymers and copolymers.

Particularly preferred polyethylene polymers are low and medium density polymers such as those prepared in accordance wih U.S. Pat. Nos. 4,011,382, 4,302,566 and 4,302,565 incorporated herein by reference.

Design characteristics of the finishing machine such as, for example, mixing arm density (number of sets of arms per inch of shaft), arm speed, arm thickness, and vessel aspect ratio, all influence the specific energy input required to process the resin. Depending upon the particular machine design chosen, it has been found that a specific energy input reduction of between about 10 percent and about 30 percent is achieved when operating within the instant finisher volume utilization range (40 to 95 percent); tip velocity (500 to 800 in/sec); and superficial mixing intensity (0.7 kw/l or greater) as compared to the prior art practices.

For example, when using a finisher having an inside diameter of 14 inches and a chamber length of 21 inches (e.g., Wedco 14/21) and a mixing arm thickness of 0.75 inch, it has been found that it is preferable to operate the finisher with the following design characteristics:
Froude Number: 60–120
Arm Density: 0.285–0.571 sets of arms per inch (2 arms per set)

The process of the present invention is suitably effected in a continuous fashion, although a semi-continuous method could be used if desired. The instant process is preferably carried out at atmospheric pressure, although a higher or lower pressure could be used if desired.

The resin employed in the process of the invention can be added singly to the finisher in continuous fashion, or it can be added together with conventional additives, in either single or multiple streams. The additives, if employed, are used in minor amounts of less than 50 weight percent, based upon the total composition in the finisher. Typical optional additives which can be liquids or solids would include, for example, pigments, dyes, fillers, stabilizers, lubricants, antistatic agents, fire retardants, combinations thereof and the like. Illustratively, such materials comprise comparatively large particle size solids, for example, stabilizers such as ultraviolet stabilizers as 2-hydroxy-4-n octoxybenzophenone having particle sizes in the range of from about 75 to 600 micrometers. Such materials also comprise somewhat smaller size solids, including, for example, pigments such as titanium dioxide, carbon black, ultramarine blue, cadmium orange, zinc oxide, iron oxide and similar materials, of particle size in the range from about 5 micrometers down to particles having an average diameter less than 1 micrometer, e.g., about 0.2 micrometer. Other suitable solids include magnesium carbonate, calcium carbonate, silicon dioxide, asbestos china clay, lignite, anthracite coal, bituminous coal, silicates, wood dust, cork dust, cellulose and a wide variety of color agents. In addition, other fillers, fire retardants, stabilizers, etc. which are suitable include finely divided functional solids conventionally incorporated into resins.

The following examples are intended to illustrate, but in no way limit, the present invention.

EXAMPLE 1

Into a commercial finishing machine (Wedco #14/21) having the following design characteristics:
  8 mixing arms set (2 arms per set)
  0.75 inch diameter arm
  14 inch diameter by 21 inch length mixing chamber
  2 scraper sets (2 scrapers per set) and operated at
  700 inches per second mixing arm tip velocity
  1039 rpm shaft speed
was continuously fed granular polyethylene resin particles having a particle size of between 70 and 2500 microns at temperature of 75° F. The resin had a melt index of 2 and a density of 0.920. The resin emerged from the finisher at a temperature of 210° F.

The resin flow rate was varied from 300 lbs/hr to 2460 lbs/hr in order to provide percent volume utilization of the finisher ranging from 24.3% to 55% respectively. A breakoff point for specific energy input (SEI) was found at about 48 percent volume utilization. Between 48 and 55% volume utilization there was a 25.7 percent reduction in SEI. Above 55% the SEI begins to level off. At the breakoff point of 48%, the superficial mixing intensity is 0.7 Kw/Liter and, the projected area intensity, defined as the net energy consumed by the resin divided by the total working projected area of the mixing arms and scrapers within the resin bed, is about 1.1 Kw/in$^2$. At 55% volume utilization where the SEI begins to level off again, the superficial mixing intensity is 1.1 Kw/liter. Thus, above this intensity, the SEI remains basically constant.

The results are presented in Table I which follows.

TABLE I

| Resins Rate lbs/hr | Percent Volume Utilization (of finisher) | Specific Energy Input kw hr/lb |
| --- | --- | --- |
| 300 | 24.3 | $4.00 \times 10^{-2}$ |
| 610 | 35.0 | $3.38 \times 10^{-2}$ |
| 920 | 41.8 | $3.28 \times 10^{-2}$ |
| 1200 | 48.0 | $3.23 \times 10^{-2}$ |
| 1440 | 49.2 | $2.96 \times 10^{-2}$ |
| 1820 | 50.7 | $2.53 \times 10^{-2}$ |
| 2060 | 51.6 | $2.50 \times 10^{-2}$ |
| 2460 | 55.0 | $2.40 \times 10^{-2}$ |

EXAMPLES 2-3

Using identical procedures, ingredients and operating conditions as those of Example 1 above, except that either 6 mixing arm sets (Example 2) or 4 mixing arms sets (Example 3) were employed, resin was processed in order to find breakoff points for SEI. For Example 2 an SEI breakoff point at a volume utilization of about 53 was found whereas for Example 3 a breakoff was seen at about 76 volume utilization of finisher.

At the breakoff points of 53.1 and 76.8 the superficial mixing intensities are 0.7 and 0.8 Kw/liter, respectively. At the same points, the projected area intensity is 1.1 Kw/in$^2$ for each.

The results are presented in Table 2 which follows.

TABLE II

| Resin Flow Rate lbs/hr | Example 2 Percent Volume Utilization (of Finisher) | Example 2 Specific Energy Input Kw hr/lb | Example 3 Percent Volume Utilization (of Finisher) | Example 3 Specific Energy Input Kw hr/lb |
| --- | --- | --- | --- | --- |
| 300 | 23.72 | $4.07 \times 10^{-2}$ | 23.7 | $3.83 \times 10^{-2}$ |
| 610 | 36.2 | $3.28 \times 10^{-2}$ | 37.3 | $3.28 \times 10^{-2}$ |
| 920 | 47.7 | $3.15 \times 10^{-2}$ | 53.0 | $3.18 \times 10^{-2}$ |
| 1200 | 53.1 | $3.08 \times 10^{-2}$ | 64.4 | $3.08 \times 10^{-2}$ |
| 1440 | 58.73 | $2.99 \times 10^{-2}$ | 76.8 | $3.06 \times 10^{-2}$ |
| 1760 | 65.5 | $2.89 \times 10^{-2}$ | — | — |
| 2160 | 70.1 | $2.73 \times 10^{-2}$ | — | — |
| 1720 | — | — | 85.6 | $2.98 \times 10^{-2}$ |
| 2060 | — | — | 87.9 | $2.82 \times 10^{-2}$ |

EXAMPLE 4

Examle 3 was repeated identically except that the finisher was operated at 604 inches per second mixing arm tip velocity, 825 rpm shaft speed. An SEI breakoff point was found at a finisher volume utilization of about 90.6 percent.

At the breakoff point of about 90 percent the superficial mixing intensity is 0.8 Kw/liter.

The results are presented in Table III which follows.

TABLE III

| Resins Rate lbs/hr | Percent Volume Utilization (of finisher) | Specific Energy Input kw hr/lb |
| --- | --- | --- |
| 300 | 37.5 | $3.73 \times 10^{-2}$ |
| 610 | 60.3 | $3.11 \times 10^{-2}$ |
| 920 | 76.8 | $3.04 \times 10^{-2}$ |
| 1200 | 86.7 | $3.03 \times 10^{-2}$ |
| 1380 | 90.6 | $3.04 \times 10^{-2}$ |
| 1720 | 93.5 | $2.88 \times 10^{-2}$ |

What is claimed is:

1. An improved process for finishing particulate resin by continuously feeding said resin into a finisher and mechanically working said resin in said finisher to provide finished resin having an elevated temperature, thereafter discharging said finished resin from said finisher, the improvement comprising operating said finisher at a volume utilization of between about 40 and about 95 volume percent at a tip velocity of between 500 and about 800 inches per second and a superficial mixing intensity of 0.7 to 1.1 kilowatts per liter.

2. The process of claim 1 wherein the resin particles are selected from the group consisting of ethylene, propylene and butene-1 homopolymer and copolymer and interpolymer particles.

3. The process of claim 1 wherein said resin particles enter said finisher at between about ambient temperature and about 200° F. and are discharged from said finisher at an elevated temperature below the melt temperature of the resin.

4. The process of claim 1 wherein the said particulate resin is selected from the group consisting of granules, powder and pulverized particles.

5. The process of claim 1 wherein said particulate resin comprises particles having a particle diameter of from about 44 microns to about 4000 microns.

6. The process of claim 5 wherein said particle diameter is from about 70 microns to about 2500 microns.

7. The process of claim 1, wherein the projected area intensity is about 1 or greater.

8. The process of claim 1, wherein the superficial mixing intensity does not exceed about 1.1 kw/liter.

* * * * *